(12) United States Patent
Thompson et al.

(10) Patent No.: US 12,538,916 B2
(45) Date of Patent: Feb. 3, 2026

(54) METHOD OF SELECTIVELY TREATING VEGETATION IN A FIELD

(71) Applicant: Exel Industries, Epernay (FR)

(72) Inventors: Heath Aaron Thompson, Highbury (AU); Andrew Douglas Snowball, Woodville South (AU); David Paul Lowe, Aldinga Beach (AU)

(73) Assignee: Exel Industries, Epernay (FR)

( * ) Notice: Subject to any disclaimer, the term of this patent is extended or adjusted under 35 U.S.C. 154(b) by 433 days.

(21) Appl. No.: 18/007,858

(22) PCT Filed: Jun. 17, 2021

(86) PCT No.: PCT/IB2021/055345
§ 371 (c)(1),
(2) Date: Dec. 2, 2022

(87) PCT Pub. No.: WO2021/255676
PCT Pub. Date: Dec. 23, 2021

(65) Prior Publication Data
US 2023/0292737 A1      Sep. 21, 2023

(30) Foreign Application Priority Data

Jun. 18, 2020 (AU) .............................. 2020902018

(51) Int. Cl.
*A01M 21/04* (2006.01)
*A01M 7/00* (2006.01)
(Continued)

(52) U.S. Cl.
CPC ........ *A01M 21/043* (2013.01); *A01M 7/0089* (2013.01); *G06T 7/11* (2017.01);
(Continued)

(58) Field of Classification Search
None
See application file for complete search history.

(56) References Cited

U.S. PATENT DOCUMENTS

2017/0031365 A1   2/2017   Ramanathan et al.
2019/0362146 A1   11/2019  Polzounov et al.
(Continued)

FOREIGN PATENT DOCUMENTS

AU    2004202534 A1 *  1/2006
EP      970595 A1       1/2000
(Continued)

OTHER PUBLICATIONS

Gonzalez-de-Santos, P., Ribeiro, A., Fernandez-Quintanilla, C. et al. Fleets of robots for environmentally-safe pest control in agriculture. Precision Agric 18, 574-614 (2017). https://doi.org/10.1007/s11119-016-9476-3. Published online Oct. 20, 2016. (Year: 2016).*

(Continued)

*Primary Examiner* — SJ Park
*Assistant Examiner* — Caroline E. Depalma

(57) ABSTRACT

The present disclosure relates to a method of selectively treating vegetation in a field with a treatment apparatus that is configured to move in the field and to treat vegetation in the field. In particular, the method includes determining a location of target vegetation in the field and having the treatment apparatus, such as a sprayer, move to the target vegetation in the field and treat the tart vegetation in the field with a treatment applicator disposed on the treatment apparatus.

19 Claims, 6 Drawing Sheets

(51) Int. Cl.

| | | |
|---|---|---|
| G06T 7/11 | (2017.01) | |
| G06T 7/136 | (2017.01) | |
| G06V 10/56 | (2022.01) | |
| G06V 10/60 | (2022.01) | |
| G06V 10/764 | (2022.01) | |
| G06V 20/10 | (2022.01) | |
| G06V 20/13 | (2022.01) | |
| G06V 20/17 | (2022.01) | |

(52) U.S. Cl.
CPC .............. *G06T 7/136* (2017.01); *G06V 10/56* (2022.01); *G06V 10/60* (2022.01); *G06V 10/764* (2022.01); *G06V 20/13* (2022.01); *G06V 20/17* (2022.01); *G06V 20/188* (2022.01); *G06T 2207/10024* (2013.01); *G06T 2207/10032* (2013.01); *G06T 2207/30188* (2013.01)

(56) References Cited

U.S. PATENT DOCUMENTS

| | | | |
|---|---|---|---|
| 2020/0342225 | A1* | 10/2020 | Schumann ............. G06N 20/00 |
| 2024/0040959 | A1* | 2/2024 | Loukili ................. B05B 12/082 |

FOREIGN PATENT DOCUMENTS

| | | | | |
|---|---|---|---|---|
| EP | 3210447 | A1 | 8/2017 | |
| WO | WO-2020120283 | A1 * | 6/2020 | ............. A01H 1/027 |

OTHER PUBLICATIONS

A. AlSuwaidi, C. Veys, M. Hussey, B. Grieve and H. Yin, "Hyperspectral selection based algorithm for plant classification," 2016 IEEE International Conference on Imaging Systems and Techniques (IST), Chania, Greece, 2016, pp. 395-400, doi: 10.1109/IST.2016.7738258. (Year: 2016).*

Gonzalez-De-Snatos Pablo, et al., Fleets of robots for environmentally-safe pest control in agriculture, Precision Agriculture, Vo9l, 18, No. 4, Oct. 20, 2016, pp. 574-614.

International Application, International Search Report and Written Opinion, PCT/IB2021/055345, Sep. 17, 2021, 13 pages.

N. Otsu, A Threshold Selection Method from Gray-Level Histograms, IEEE Transactions on Systems, Man, and Cybernetics, vol. 9, Issue: 1, Jan. 31, 1979.

Torres-Sanchez, J., Pena, J.M., de Castro, A. I., Lopez-Granados, F. Multi-temporal mapping of the vegetation fraction in early-season wheat fields using images from UA V. Computers and Electronics in Agriculture, Elsevier BV, Computers and Electronics in Agriculture, 103, 104-113, 2014.

Torres-Sanchez, J., Lopez-Granados, F., Pena, J.M. An automatic object-based method for optimal thresholding in UAV images: Application for vegetation detection in herbaceous crops. Computers and Electronics in Agriculture, 14, 43-52, 2015.

M. Hassanein et al. A New Vegetation Segmentation Approach for Cropped Fields Based on Threshold Detection from Hue Histograms, Sensors 2018, 18, 1253; doi:10.3390/s18041253.

P. Bosilj et al., Connected attribute morphology for unified vegetation segmentation and classification in precision agriculture, Computers in Industry 98 (2018) 226-240.

Mateen et al., Weed Detection in Wheat Crop Using UAV for Precision Agriculture, Pak J. Agri. Sci. vol. 56(3), 775-784; 2019. ISSN (Print) 0552-9034, ISSN (Online) 2076-0906. DOI: 10.21162/PAKJAS/19.8036.

H. Oebel, Teilschlagspezifische Unkrautbekampfung durch raumbezogene Bildverarbeitung im Offline- (und Online-) Verfahren (TURBO), Dissertation, Hohenheim 2006 Veroffentlichungshinweis der Universitat Hohenheim zu (No Translation Available).

Tang, L., L.F. Tian, B.L. Steward, J.F. Reid: Texture-based weed classification using Gabor wavelets and neural network for real-time selective herbicide applications. American Society of AQricultural EnQineers (ASAE) Paper 99-3036, 1999.

Notice of Opposition, EP 2173452438, Jul. 21, 2025.

* cited by examiner

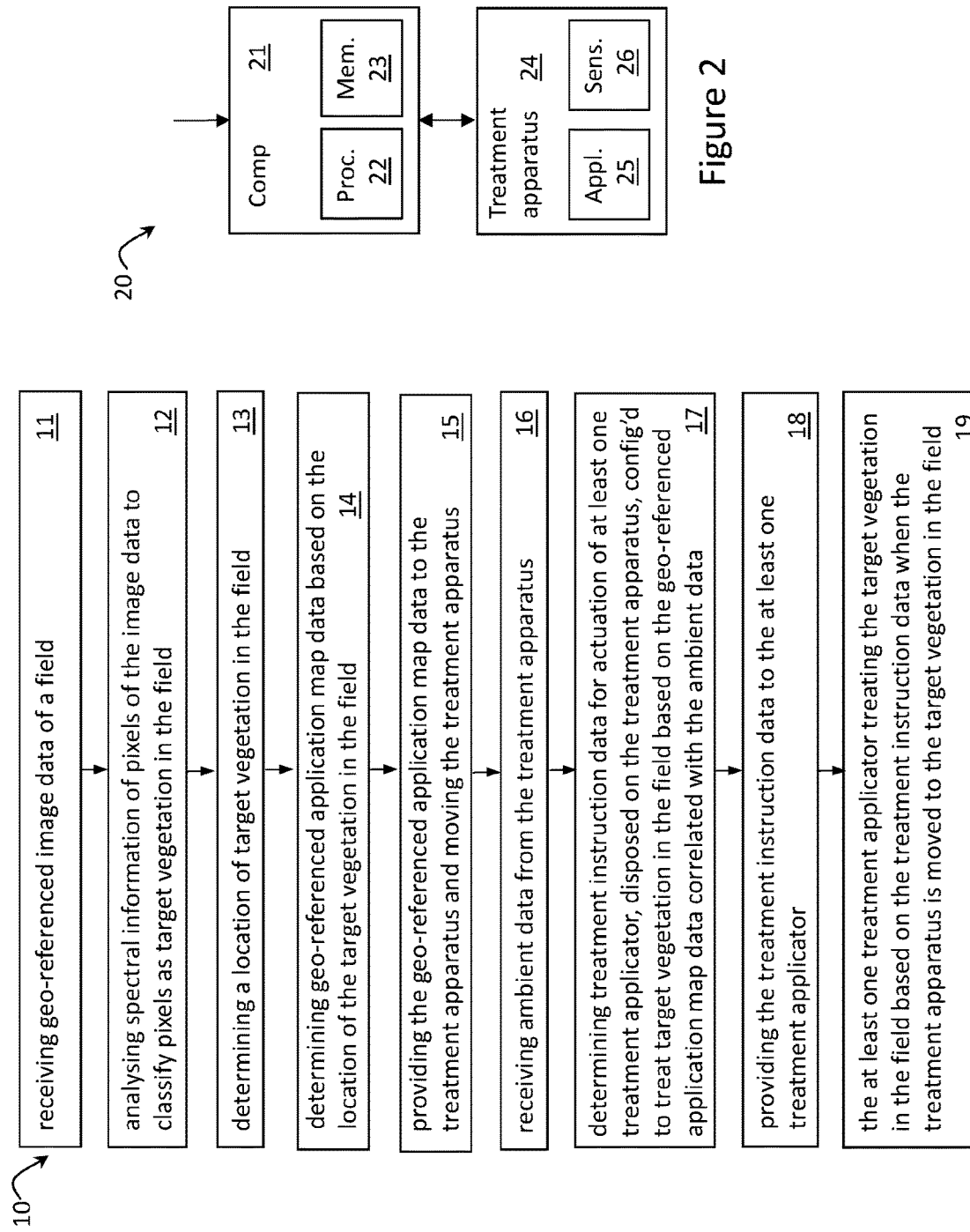

METHOD OF SELECTIVELY TREATING VEGETATION IN A FIELD

CROSS-REFERENCES TO RELATED APPLICATIONS

This is a U.S. National Stage of International Application No. PCT/IB2021/055345, filed Jun. 17, 2021, which claims priority to Australian Patent Application, Ser. No. 2020902018, filed Jun. 18, 2020, the entirety of each of which is incorporated herein by reference.

TECHNICAL FIELD

The present invention relates to a method of selectively treating vegetation in a field with a treatment apparatus that is configured to move in the field and to treat vegetation in the field. In particular, the method includes determining a location of target vegetation in the field and having the treatment apparatus, such as a sprayer, move to the target vegetation in the field and treat the target vegetation in the field with a treatment applicator disposed on the treatment apparatus.

BACKGROUND OF INVENTION

Controlling weeds and other vegetation types in fields, such as broad acre or large-scale farming enterprises, may be costly in both economic and environmental terms. Weed infestation, or infestation by any undesirable vegetation in a field, creates nutrient and moisture competition which impairs the development of beneficial crops in the field.

In an existing exemplary application with respect to areas where low or no-till cultivation and/or soil maintenance practices can be observed in the interests of soil moisture retention or soil structure preservation (erosion avoidance), the control of weeds and/or any form of undesirable vegetation is of significant concern. In areas of the world in which tillage (ploughing and other forms of substantiative soil disturbance) can be used to control weeds and undesirable vegetation, control is achieved by submergence of undesirable vegetation. In areas where low or no-till farming practices occur, it is often necessary to use agrochemicals to achieve and maintain control of weeds and undesirable competing plant species.

One existing practice of controlling weeds is to "blanket spray" the field-ensuring that undesirable vegetation is contacted and thereby controlled. Those familiar with this practice would observe, however, that the process is invariably inefficient. Blanket spraying requires that 100% of the land area of the field is sprayed in order to control weeds or undesirable vegetation that may only be present in only a certain percentage of the total area.

Another existing practice improves upon the "blanket spraying" practice by employing a spraying apparatus equipped with a camera that is configured to traverse a field, detect the weeds or target vegetation, and spray the detected weeds with agrochemicals. Such camera-based detection and selected spraying means, however, may be inefficient due to the need to only travel at a speed which allows the forward (or rearward) projecting cameras sufficient time to detect weeds or other undesirable vegetation, process the existence or absence of said weed or undesirable vegetation and then execute the treatment action. Users of this practice often observe that a considerable component of the economic saving derived from the reduction in agrochemical cost is offset by the extra time associated with operating such a spraying apparatus.

A further disadvantage arising from the use of the existing camera-based spraying apparatus is that it is not possible to determine the area needing to be treated until after passage of the camera(s) over the entirety of the subject land area. Typically, the distance between the detection and treatment mechanisms is about 1-2 metres. This limitation imposes further inefficiencies and costs upon primary producers or those providing services to primary producers, such as not being able to determine, in advance, the quantity of agrochemical or treatment means necessary to cover the infested area and, as a consequence, the requirement to carry more than might otherwise be necessary to complete the task. In this case, the unused agrochemical may also require disposal resulting in further economic cost and environmental impact.

Other disadvantages include the inability of the operator to make dynamic, tactical or strategic decisions concerning the viability of treatment on marginally or non-infested areas and the consequent saving of time and running costs of the spraying apparatus and the avoidance of ground compaction and other adverse by-products of unnecessarily traversing the land. Further, high wind may affect targeted coverage, boom yaw between detection and application may affect targeted application, the boom itself may affect the illumination of the ground beneath it which may affect the detection process, intensive data communication is required between the devices on the apparatus and the apparatus may be required to move slower to provide time to process this data, the devices are also expensive and sensitive to shock, and the number of devices required may restrict the width of the boom of the apparatus.

A reference herein to a patent document or other matter which is given as prior art is not to be taken as an admission that that document or matter was known or that the information it contains was part of the common general knowledge in Australia or elsewhere as at the priority date of any of the disclosure or claims herein. Such discussion of prior art in this specification is included to explain the context of the present invention in terms of the inventor's knowledge and experience.

SUMMARY OF INVENTION

According to one aspect of the present invention, there is provided a computer-implemented method of selectively treating vegetation in a field with a treatment apparatus that is configured to move in the field and to treat vegetation in the field, the method including: receiving geo-referenced image data of a field, from one or more image capture devices not coupled to the treatment apparatus, wherein the geo-referenced image data includes a plurality of pixels and geo-reference data associated with each one of the pixels; analysing spectral information of the pixels to classify pixels as target vegetation in the field; determining a location of the target vegetation in the field based on the geo-reference data associated with pixels classified as said target vegetation; determining geo-referenced application map data based on the location of the target vegetation in the field, wherein pixels not classified as said target vegetation are not included in the geo-referenced application map data; providing the geo-referenced application map data to the treatment apparatus and moving the treatment apparatus based on the geo-referenced application map data; receiving ambient data from the treatment apparatus moving in the field; determining treatment instruction data for actuation of at least one treatment applicator, disposed on the treatment apparatus, configured to treat vegetation in the field, based on the geo-referenced application map data correlated with the ambient data; providing the treatment instruction data to the at least one treatment applicator; and the at least one treatment applicator treating the target vegetation in the field based on the treatment instruction data when the treatment apparatus is moved to the target vegetation in the field.

According to another aspect of the present invention, there is provided a system for selectively treating vegetation in a field, the system including: a treatment apparatus configured to move in the field and to treat vegetation in the field with at least one treatment applicator disposed on the treatment apparatus; and one or more processors configured to: receive geo-referenced image data of a field, from one or more image capture devices not coupled to the treatment apparatus, wherein the geo-referenced image data includes a plurality of pixels and geo-reference data associated with each one of the pixels; analyse spectral information of the pixels to classify pixels as target vegetation in the field; determine a location of the target vegetation in the field based on the geo-reference data associated with pixels classified as said target vegetation; determine geo-referenced application map data based on the location of the target vegetation in the field, wherein pixels not classified as said target vegetation are not included in the geo-referenced application map data; provide the geo-referenced application map data to the treatment apparatus and move the treatment apparatus based on the geo-referenced application map data; receive ambient data from the treatment apparatus moving in the field; determine treatment instruction data for actuation of the at least one treatment applicator based on the geo-referenced application map data correlated with the ambient data; and provide the treatment instruction data to the at least one treatment applicator, wherein the at least one treatment applicator is configured to treat the target vegetation in the field based on the treatment instruction data when the treatment apparatus is moved to the target vegetation in the field.

Preferably, the treatment apparatus is a sprayer (e.g. a tractor with spraying capability) carrying one or more agrochemicals for treatment applicators to treat the target vegetation in the field by spraying the agrochemicals on the target vegetation. It will be appreciated by those persons skilled in the art that other treatments can be applied other than agrochemicals. For example, agro-nutrients, trace elements, and biological agents (such as *Bacillus thuringiensis*) can be applied to the target vegetation.

Alternatively, the treatment apparatus may be a tractor configured to move to the target vegetation and to treat the target vegetation with another type of treatment applicator, such as a heat applicator or a till for tilling the soil. It will be understood by those persons skilled in the art that, while the treatment apparatus is described as a tractor, the treatment apparatus could also be operated via the air with an aerial-sprayed material. For example, the sprayer is an aerial drone with spraying capability.

An important function of the one or more processors is to facilitate the integration of the geo-referenced application map data and the ambient data, or apparatus metrics, into treatment instruction data to the treatment applicator. Preferably, the treatment instruction data is sent to a programmable logic controller of the treatment apparatus and or treatment applicator for the purposes of timely and highly accurate (georeferenced) actuation of the treatment applicator. For example, the treatment applicator is an actuated liquid chemical applicator implemented on a self-propelled, trailed or other form of agrochemical sprayer.

As mentioned, pixels not classified as target vegetation are not included in the geo-referenced application map data. Thus, the file size of the geo-referenced application map data is reduced which is advantageous for transmission of the map data and for subsequent processing of the map data. For example, a pre-processor may be used to determine the geo-referenced application map data and then to transmit this data wirelessly to an on-board processor of a sprayer for further processing so as to provide the treatment instruction data to the treatment applicator on the sprayer. It is therefore advantageous for the on-board processor to be required to only process a smaller mass of map data and to be able to do so in a timely manner. Reducing the file size therefore overcomes processing barriers faced by the one or more processors.

The image capture devices are not coupled to the treatment apparatus such that the detection mechanism is physically uncoupled or detached from the spraying apparatus. This could be via various means, for example, with the detection mechanism mounted on an aerial mechanism (e.g. UAV/drone, manned aircraft or satellite). This also means that the detection mechanism can be moved over part of or the complete paddock before the treatment apparatus even enters the paddock. Additionally, the heading of the detection mechanism can be independent to the treatment apparatus. For example, the detection mechanism can travel in an east/west direction, whereas the treatment apparatus can travel in a north/south direction or any other direction if needed.

Advantages of uncoupled detection include knowing the chemical requirement prior to starting the spray application which in turn can reduce tank fills per day and therefore improved spray work rate, decrease number of trips over paddocks reducing ground compaction, the capacity to 'learn' and create a database of weeds and expand the database of weeds, and the initial purchase cost of the treatment apparatus may be reduced.

Advantages of uncoupled detection using drones includes producing maps conveniently and on a needs' basis. The method and system can also take advantage of fast improvements to drone/sensor technology. The drone/sensor technology can produce higher resolution imagery and paddock maps quickly, and a choice of sensors can be made.

Uncoupled detection using manned aircraft has additional advantages of covering vastly larger areas with very high spatial and spectral resolution, and higher capture ceiling height with a larger image footprint. Uncoupled detection using satellites has additional advantages of being very cheap per unit area, and satellite maps are quality controlled for data, altitude, angle and luminosity.

Preferably, the method further includes determining an optimal route for the treatment apparatus to move in the field based on the location of the target vegetation in the field and recording the optimal route in the geo-referenced application map data. The method determines the optimal route around the field for the treatment apparatus by analysing the geo-referenced application map for target vegetation densities. If there is no target vegetation in certain areas, for instance, then that area can be removed from the optimal route altogether. That is, as the whole paddock does not need to be sprayed, the optimal route saves operational hours and machine hours and adverse effects to the paddock from machinery, such as unnecessary ground compaction.

In an embodiment, analysing the spectral information of the pixels includes supervised classification using a classifier trained on a spectral signature of target vegetation in a field. Preferably, the method further includes embedding a chlorophyll spectral signature in selected pixels of the image data corresponding to vegetation in the field and analysing the chlorophyll spectral signature of these pixels using the classifier.

In an embodiment, analysing the spectral information of the pixels includes unsupervised and or supervised classification using spectral algorithms to classify pixels as target vegetation in a field.

In an embodiment, analysing the spectral information of the pixels includes object-based learning to classify pixels as target vegetation in a field.

In an embodiment, the geo-referenced image data is recorded as data native to the one or more image capture devices. That is, the recorded data is in the same format as the sensor that captured it. The resolution of the data corresponds to a ground sample distance of, for example, 5 cm or less. In an example, the geo-referenced image data is recorded as raster data.

Traditionally, the geo-referenced image data is recorded as shapefiles. For example, an area map that can be produced from multiple sources (soil analysis, yield, nitrogen sensing etc) which is formatted into a shapefile and inputted into most current spray apparatus control systems. This shapefile can then be acted upon by the typical spray apparatus. The shapefiles, however, may not have sufficient spatial resolution as the shapefile must have relatively large polygons, for example larger than 5 m×5 m, otherwise they will run slowly, freeze or even miss treatment in polygons because of the lack of timely processing. Recording may not be assured depending on the size of the shapefile polygons too.

As a shapefile is locked in position relative to a map, a typical spraying apparatus is free to approach at any heading which can lead to inaccurate treatment and wastage. Loading a shapefile for a larger paddock (e.g. over 150 Ha) can cause freezing and jerky operation as the data format native to the image capture device is required to be formatted to vector data for a shapefile. The shapefile format (i.e. vector based), by definition, is less granular compared to other formats, such as a binary raster-based format. Accordingly, typical spraying apparatus processing shapefiles will generally use more chemical than apparatuses using data formats such as those native to the image capture devices.

In an embodiment, the method further includes classifying the target vegetation in the field as a plurality of grades of target vegetation based on a vegetation index.

In an embodiment, analysing the spectral information of the pixels includes classifying pixels as areas of the field that are not target vegetation in the field, and determining areas of the field that remain as the target vegetation in the field.

In an embodiment, the geo-referenced image data of the field includes a plurality of channels of data, and the method further includes consolidating the channels to form one channel for the geo-referenced application map data by representing the target vegetation as a vector of intensity values. Further, each of the grades of the target vegetation can be represented as a vector of intensity values.

In an embodiment, the method further includes segmenting the geo-referenced application map data by applying one or more threshold values to the intensity values.

In an embodiment, the treatment apparatus further includes a plurality of sensors for sensing the ambient data. The ambient data may include static and dynamic metrics relating to the treatment apparatus, such as location of the treatment apparatus and temperature surrounding the treatment apparatus. In a further example, the method includes sensing location data of the at least one treatment applicator with a corresponding sensor and correlating the location data with the location of the target vegetation in the treatment instruction data.

In an embodiment, wherein the ambient data further includes one or more of: speed of the at least one treatment applicator, heading of the at least one treatment applicator, yaw of the at least one treatment applicator, direction of the at least one treatment applicator, position of the at least one treatment applicator, and height of the at least one treatment applicator.

Modern agriculture has progressively developed larger and wider treatment apparatuses to make the process of completing jobs more efficient. For example, a treatment apparatus can have a spray width of up to 54 m, and it is predicted to further increase into the future. As the apparatus widths grow in size, so does the chance of having that apparatus yaw from various external influences (turning, ambient wind, higher working speeds etc). The method correlates the geo-referenced application map data with the ambient data—including, for example, the yaw data—to ensure the treatment applicator is accurately treating the target vegetation in the field.

In contrast, a typically spraying apparatus with a coupled (i.e. physical link) detection mechanism experiences a yaw angle, which creates an area (Miss Zone) where the detection mechanism senses a target but the treatment mechanism misses that target because of the angle of the apparatus. If this spraying apparatus is at an angle to the heading, this skews the detection zone compared to the treatment zone, creating a Miss Zone where undesired targets will be detected but not treated. As the spraying apparatus angle increases compared to the direction of travel, this further increases the Miss Zone, increasing the amount of targets missed. Not only are the targets not treated, but the spraying apparatus is still using chemical to spray an incorrect position.

For example, if this typical spray apparatus has a boom width of 48 m and each boom wing is 22 m from its pivot point to the boom tip (rigid centre section not included), and the boom tip had flexed aft against the heading by 4 m, this gives an angle of yaw of approximately 10 degrees. If the coupled detection zone's furthest extent is 1 m in front of the treatment zone, then the Miss Zone is approximately 0.17 m (17 cms). Typical spray apparatuses have a detection mechanism every 1 m so, at up to 42 places along the spray apparatus (rigid centre section not included), weeds up to 17 cms can be passed over by the spraying apparatus 42 times and not be treated on either boom wing. There is the possibility that the next detection mechanism along the spray apparatus will pick up the target, but as the target is entering the 2nd detection zone later, this could reduce the amount of time required to process the detection and then miss or delay the treatment. At best, if 2 detection mechanisms pick up a target, then double the amount of treatment will be applied as was needed, thereby increasing total treatment usage. Furthermore, the recorded spray area does not take into account any of the above deviations of the apparatus therefore incorrectly recoding the spray application.

In an embodiment, the treatment apparatus includes more than one treatment applicator, and the method includes selecting one of the treatment applicators closest to the target vegetation in the field to treat the target vegetation based on the ambient data.

As mentioned, the treatment apparatus is preferably a sprayer carrying one or more agrochemicals for the at least one treatment applicator to treat the target vegetation in the field. The treatment instruction data preferably includes instructions for applying the one or more of agrochemicals to the target vegetation in the field with the at least one treatment applicator.

In an embodiment, the treatment apparatus includes a rigid portion and a flexible suspended boom including the treatment applicators disposed thereon, each having one or more nozzles for applying the one or more agrochemicals to the target vegetation in the field. The plurality of sensors are disposed on the rigid portion and the suspended boom at spaced apart locations, and the sensors sense position data of each of the one or more nozzles relative to the rigid portion of the treatment apparatus. The method further includes selecting one of the nozzles of the treatment applicator closest to the target vegetation in the field to treat the target vegetation based on the ambient data.

In an embodiment, the sensors sense heading data of each of the one or more nozzles, and the method includes determining in real-time a position of each of the one or more nozzles in the field. The treatment apparatus therefore addresses the above problem of yaw angle for a typical spray apparatus by having the treatment apparatus and detection mechanism uncoupled and completely free to move in any heading independently.

The sensors may further be location determining devices mounted on the boom and rigid part of the treatment apparatus that are configured to sense the heading and position of the at least one treatment applicator disposed on the treatment apparatus. These multiple location determining devices (LDDs) accurately and precisely sense the change of heading and position of the treatment applicators. As the LDDs are mounted on the rigid centre part of the spray apparatus and the flexible apparatus wings, the method can determine the position in real-time of all nozzles of the treatment applicators mounted on the treatment apparatus.

For example, if some of the treatment applicators were experiencing an increasing angle of yaw—or the treatment apparatus was turning or travelling in reverse—the method could sense this via the LDDs. The method could then determine that the apparatus changes treatment applicator to the one closest to the target.

As embodiments of the treatment apparatus have an uncoupled image capture mechanism and are completely agnostic to heading, track or yaw angle (i.e. can treat whilst turning, in reverse, etc), the system can be fitted to a conventional spray apparatus. Further, as there are no time constraints for real-time processing as this has been done prior to treatment, this apparatus is expected to treat at any speeds. The system can also be fitted to any width of spraying apparatus as the location of every treatment applicator is known.

Knowing the precise geo-coordinates of weeds or other undesirable vegetation too potentially allows farmers, contractors or other operatives, to target spray only the areas infested by weeds or other undesirable vegetation. In addition to the location, the treatment instruction data may include instructions for applying the one or more agrochemicals to the target vegetation in the field with the at least one treatment applicator. That is, the above method may also control undesirable vegetation in beneficial crops by the selective application of agrochemicals, or other treatment means.

The potential in agrochemical saving derived from only spraying infested areas of target vegetation in a field has significant appeal from four distinct perspectives:

economic—saving in the cost of agrochemical;
economic—reducing labour costs derived from reduced spraying time;
environmental—reducing chemical released into the environment; and
enviro/economic—reducing machine running time thus saving costs associated with fuel, depreciation and maintenance, coupled with reduced environmental emissions associated with reduced running time.

That is, the method and system provides these advantages by dynamically and strategically assessing the entire field for treatment so that:

the optimal time for spraying/treatment—whether the development stage of the target vegetation is at an optimal point for spraying or treatment;
optimal combination and concentration of agrochemicals or alternative treatment means;
the economic viability of spraying/treating various areas within the total areas from where images/data has/have been taken; and
agrochemical storage requirements being known before the task is commenced (including, but not limited to, how much chemical volume will the sprayer need to be filled with to complete the proposed area).

Embodiments of the present invention provide that the quantity of agrochemical necessary to cover the infested area of target vegetation is determined in advance so that only the required amount of agrochemical is required to be carried by the sprayer to complete a task. Thus, surplus agrochemical no longer requires disposal, resulting in an economic saving and reduced environmental impact of waste, and is not subjected to reduced efficacy via degradation.

In an embodiment, the method further includes kinematic modelling of each of the components of the treatment apparatus in a dynamic apparatus model based on physical constraints of the treatment apparatus and comparing the dynamic apparatus model to the ambient data sensed by the sensors of the treatment apparatus to resolve ambient influences on the ambient data.

In an embodiment, the method further includes recording application of the at least one treatment applicator treating the target vegetation in the field based on the treatment instruction data on a storage device. By recording the application of the at least one treatment applicator in real-time to, in some cases, the same level of granularity as exists in the geo-referenced application map data, the treatment apparatus can utilise this information contemporaneously thus allowing it to correspondingly adjust the treatment applicator.

In an embodiment, the method further includes receiving the geo-referenced image data from an unmanned aerial vehicle (UAV), or a manned vehicle, including the one or more image capture devices, configured to fly over the field and to generate the geo-referenced image data. Alternatively, the method includes receiving the geo-referenced image data from one or more satellites including the one or more image capture devices.

In an embodiment, the one or more processors include a pre-processor configured to receive the geo-referenced image data of the field, analyse the spectral information of the pixels, determine the location of the target vegetation in the field and determine the geo-referenced application map data.

In an embodiment, the pre-processor is further configured to determine an optimal route for the treatment apparatus to move in the field based on the location of the target vegetation in the field and to record the optimal route in the geo-referenced application map data.

In an embodiment, the one or more processors include an on-board processor configured to receive the geo-referenced application map data from the pre-processor, receive the ambient data from the treatment apparatus, determine the treatment instruction data, and to provide the treatment instruction data to the at least one treatment applicator.

In an embodiment, the on-board processor is further configured to receive user metrics from a user interface and to determine the treatment instruction data further based on the user metrics.

In an embodiment, some or all of the one or more processors are located on the treatment apparatus.

BRIEF DESCRIPTION OF DRAWINGS

Embodiments of the present invention will now be described with reference to the accompanying drawings, wherein:

FIG. 1 is a flow chart showing a method of selectively treating vegetation in a field according to an embodiment of the present invention;

FIG. 2 is a block diagram of a system for selectively treating vegetation in a field according to an embodiment of the present invention;

DETAILED DESCRIPTION

Figure 3:
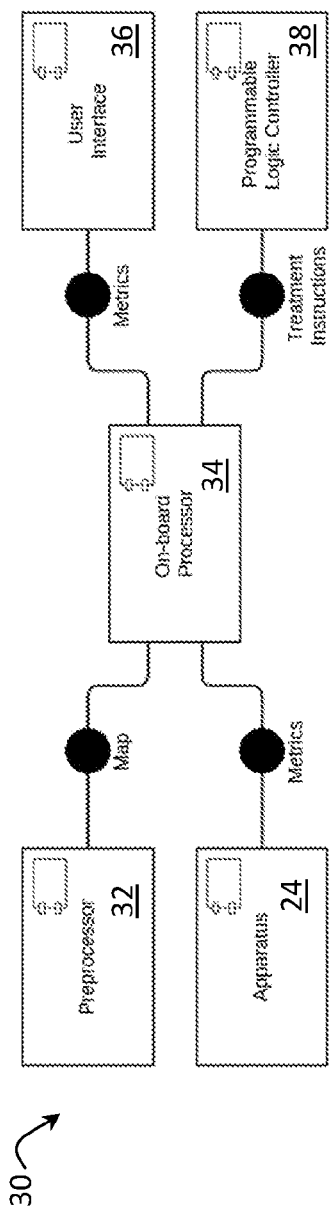
FIG. 3 is a block diagram of a system for selectively treating vegetation in a field according to an embodiment of the present invention.

A flow chat summarising a computer-implemented method 10 of selectively treating vegetation in a field with a treatment apparatus that is configured to move in the field and to treat vegetation in the field is shown in FIG. 1. The field is typically agricultural or primary production land, which may be a broad acre or large-scale farmland with cropping or grazing land for livestock. The method 10 thus detects, locates, and treats weeds or other target vegetation in the field, such as instances of rye grass on a fallow field.

The method 10 includes the steps of: receiving 11 geo-referenced image data of a field, from one or more image capture devices not coupled to the treatment apparatus, wherein the geo-referenced image data includes a plurality of pixels and geo-reference data associated with each one of the pixels; analysing 12 spectral information of the pixels to classify pixels as target vegetation in the field; determining 13 a location of the target vegetation in the field based on the geo-reference data associated with pixels classified as said target vegetation; determining 14 geo-referenced application map data based on the location of the target vegetation in the field, wherein pixels not classified as said target vegetation are not included in the geo-referenced application map data; providing 15 the geo-referenced application map data to the treatment apparatus and moving the treatment apparatus based on the geo-referenced application map data; receiving 16 ambient data from the treatment apparatus moving in the field; determining 17 treatment instruction data for actuation of at least one treatment applicator, disposed on the treatment apparatus, configured to treat vegetation in the field, based on the geo-referenced application map data correlated with the ambient data; providing 18 the treatment instruction data to the at least one treatment applicator; and the at least one treatment applicator treating 19 the target vegetation in the field based on the treatment instruction data when the treatment apparatus is moved to the target vegetation in the field.

FIG. 2 shows an embodiment of the computer-implemented method 10 being implemented by a computing system 20. The system 20 receives geo-referenced image data of a field at a computer 21, including a plurality of pixels and geo-reference data associated with each one of the pixels. The geo-referenced image data may be obtained from an unmanned aerial vehicle (UAV), including one or more image capture devices and GPS sensors, configured to fly over the field and to generate the geo-referenced image data. For example, the UAV performs aerial transects over the field to obtain the geo-referenced image data of the field, and the computer 21 receives the geo-referenced image data wireless from the UAV. Alternatively, the geo-referenced image data is provided to the computer some other memory, such as an SD card. In another embodiment, the geo-referenced image data is captured by terrestrial or other non-terrestrial means equipped with imaging and geo-referencing capability.

The computer 21 has one or more processors 22 configured to implement the steps of the method 10 in association with a data storage device or memory 23. The computer 21 may be a remote server or it may be located on a treatment apparatus 24. The method 10 may be embodied in software (e.g. program code) that is implemented by the processor(s) 22. The software for the computer 21 could be supplied in a number of ways to the system 20, such as on the memory 23 in data communication with the processor(s) 22 or via the Internet. The geo-referenced image data received by the computer 21 is then stored on the memory 23 for processing.

The system 20 then performs the method 10 to provide instructions to a treatment apparatus 24 that is configured to move in the field and to treat vegetation in the field. To do so, the treatment apparatus 24 includes at least one treatment applicator 25, disposed on the treatment apparatus 24, that is configured to treat vegetation in the field. As mentioned, the treatment apparatus 24 is preferably an agrochemical sprayer which has a suspended boom including a plurality of nozzles as treatment applicators 25 for applying agrochemicals to the target vegetation in the field. It will be appreciated, however, that the treatment apparatus 24 could take the form of other autonomous terrestrial or aerial devices. Notwithstanding, the treatment apparatus 24 is configured to receive data from the computer 21 and to move to the determined target vegetation in the field and treat the target vegetation in the field with the spraying treatment applicator 25. The data transmitted to the treatment apparatus 26 may be transmitted wirelessly or with a direct coupling, or some other method.

That is, the processor(s) 22 are configured to analyse spectral information of the pixels to classify pixels as target vegetation in the field, determine a location of the target vegetation in the field based on the geo-reference data associated with pixels classified as said target vegetation, and determine geo-referenced application map data based on the location of the target vegetation in the field. In addition, the processor(s) 22 may be further configured to determine spectral signatures of desired vegetation in the field, and soil in the field, as well as target vegetation. That classification may be performed using a classifier that was trained on prior instances of spectral signatures of desired vegetation, target vegetation, and soil in the field.

The computer 21 also receives ambient data from sensors 26 on board the treatment apparatus 24. The processor(s) 22 are further configured to determine treatment instruction data for actuation of each of the treatment applicators 25 based on the geo-referenced application map data correlated with the ambient data and provide the treatment instruction data to the treatment apparatus 24 and to the treatment applicators 25. By corelating the geo-referenced application map data correlated with the ambient data, inaccuracies such as geo-spatial inaccuracies like swath transposition and/or off target movement caused as result of ambient conditions and/or structural deflection of the treatment applicators 25 can be anticipated and corrected.

The treatment applicators 25 are then configured to treat the target vegetation in the field based on the treatment instruction data when the treatment apparatus 24 is moved to the target vegetation in the field. In addition, the treatment instruction data may further include instructions to the treatment apparatus 24 to move to the target vegetation in the field. It will be appreciated that the treatment applicators 25 include an actuator of some type to control the selective treating of the target vegetation.

In an embodiment, the treatment applicators 25 use pulse-width modulated (PWM) and or solenoid actuation of fluids to treat the proposed area using one or more nozzles to deliver application variability across the treatment applicators 25 according to a specific rather than general application need.

The treatment applicators 25 further includes a sensor to provide electronic feedback to confirm that each nozzle is operating as intended. The means used for detecting the application of agrochemicals, include:
- pressure switch (for example but not limited to air, fluid);
- electrical actuation feedback;
- flow metering (direct or indirect);
- camera;
- ultrasonic audio capture; and
- moisture detection.

In further embodiments, the treatment applicators 25 employ other means of treatment for weeds or undesirable vegetation, including, but not limited to:
- microwave energy;
- heated/boiling fluid;
- high pressure fluid jet/s (for example, a water jet of sufficient pressure/flow to treat weeds or target vegetation);
- mechanical means (for example, rods that force the said weeds or target vegetation beneath the ground as means of treatment); and
- high powered laser devices.

FIG. 3 shows another embodiment of a system 30 for selectively treating vegetation in a field. In this embodiment, the processor(s) 22 for performing the method 10 are not located in a computer 21. The system 30 includes a pre-processor 32 configured to receive the geo-referenced image data of the field, analyse the spectral information of the pixels, determine the location of the target vegetation in the field and determine the geo-referenced application map data. The system 30 further includes an on-board processor 34 configured to receive the geo-referenced application map data from the pre-processor 32, receive the ambient data from the treatment apparatus 24, determine the treatment instruction data, and to provide the treatment instruction data to a programmable logic controller 38 of the treatment applicator 25. Preferably, the on-board processor 34 is located on the treatment apparatus 24. In addition, the on-board processor 34 is further configured to receive user metrics from a user interface 36 and to determine the treatment instruction data further based on the user metrics.

The pre-processor 32 is further configured to determine an optimal route for the treatment apparatus to move in the field based on the location of the target vegetation in the field and to record the optimal route in the geo-referenced application map data.

In an embodiment, the user interface (UI) 36 allows the farmer, grower, operative of the system 20 to customise the treatment instruction data to the at least one treatment applicator 25. For example, the overlap around each weed or undesirable vegetation can be increased at the site to control vegetation too small to be detected.

In an embodiment, the geo-referenced image data provided to the system 30 will be a derivative of an orthorectified GeoTIFF file, an informal standard output of sensors commonly found on unmanned aerial vehicles (UAV). For example, a typical 4 channel image map from an RGB camera sensor with a 32-bit colour depth and a 2.5 cm GSD is provided. Other sensing technologies such as thermal or LIDAR commonly represent data using similar formats. That is, the geo-referenced image data is recorded as data native to the one or more image capture devices on the UAV.

The general purpose of classifying a geographic map is to take a large number of observations and group them into discrete data ranges. Map classification will generally occur prior to loading the map into the on-board processor 34 but may also occur on the on-board processor itself. This process is important to understand as the output is intrinsic to the on-time processing.

There are many ways to systematically classify data which they can be grouped into two broad categories: supervised and unsupervised. Supervised classification involves using discrete, selected training samples/areas to build a spectral signature that represent the regions of interest (ROI) to be classified.

Unsupervised classification uses general spectral algorithms.

In the geo-referenced application map data, the classification step achieves two purposes:
- identifies and grades treatment areas; and
- reduces the spectral scope of the map, in both bit depth and number of channels.

Multi-channel maps are consolidated and reduced to a single channel using algorithmic techniques. Using our example RGB sensor, the following algorithm determines an "Excess Green" or "exGR" measurement, one of many colour indices used to identify particular data from an image. exGR is a means of distinguishing areas of vegetation using the red, green & blue channels of an RGB camera sensor (refer equation below).

$$exGr = 2 \cdot (GR+G+B) - (RR+G+B) - (BB+G+R)$$

In this example the resultant index reduces the three input channels to a single channel. Each pixel on the map is now only defined by a single vector of intensity values that, in this case, corresponds to derived vegetation index, which reduces files size of the map.

However, as the tonal range or gradient of these values is represented with the same spectral depth as the original image, 32-bit in this case, it needs to be segmented and reduced by means of a threshold formula before it can be used for on-time processing.

In an alternative example, another algorithm is used to determine an inverse of the exGR measurement to classify areas of the field that are not target vegetation of the field using the red, green & blue channels of the image. The areas of the field in the image that remain are thus the areas of the target vegetation in the field. The location of the target vegetation in the field can then be determined using the geo-reference data associated with the pixels classified as target vegetation in this way.

Memory capacity of the on the on-board processor 34 dictates the maximum file size limits of a map. That is, the maximum size of the geo-reference application map data. Thus, the size (area and resolution) of any given map is therefore defined by the ability to reduce superfluous information and thereby "reserve" file space for critical (rather than superfluous) data. One such method of reducing the file size of a map is by segmentation. By using either global or adaptive thresholding, the tonal range can be reduced significantly by segmenting treatment areas from non-treatment areas. That is, pixels not classified as target vegetation are not included in the geo-referenced application map data to reduce file size of the map data.

Depending on the application, treatment areas of target vegetation are identified using either a binary format (to treat/not treat) or in a graded output (a variable gradient of treatment). In the case of a binary formatted map, the segmented channel j(x) would be defined by the function in FIG. 2.3.1 where I(x, y) is the original channel.

$$J(x) = \begin{cases} 1, & \text{if } I(x, y) \geq T \\ 0, & \text{otherwise} \end{cases}$$

In other words, all pixels at, or above the threshold value (T) are set to 1 and corresponds to treatment areas, whereas all pixels set to 0 correspond to non-treatment areas. For example, on a summer paddock, in an 8-bit image, areas of strong target vegetation are seen in dark green, areas of light target vegetation are seen in light green, and soil is seen in brown. In a 1-bit image, the target vegetation is seen in black and the soil in white. In a 2-bit image, the areas of strong target vegetation is seen in black, the areas of light target vegetation are seen in grey, and the soil is seen in white.

In the case where it is preferable to measure the intensity of each pixel to facilitate more discrete or granular treatment (as opposed to the single level thresholding illustrated in the previous model) the following multi-level threshold function can be applied.

$$J(x) = \begin{cases} 3, & \text{if } I(x, y) \geq T_C \\ 2, & \text{if } I(x, y) \geq T_B \text{ and } < T_C \\ 1, & \text{if } I(x, y) \geq T_A \text{ and } < T_B \\ 0, & \text{otherwise} \end{cases}$$

Segmentation in this case, is defined using three threshold values $T_A$, $T_B$ & $T_C$. Thus, each pixel on the map can now be defined by 4 states, represented using 2-bits. On-time processing can now apply a variable rate of application in accordance to these states as for the example in the figure below.

| State | Bit 1 | Bit 2 | Rate of Application |
| --- | --- | --- | --- |
| 0 | 0 | 0 | 0% |
| 1 | 0 | 1 | 33% |
| 2 | 1 | 0 | 66% |
| 3 | 1 | 1 | 100% |

It should be noted that the classification processes above maintain the spatial resolution of the input map in sufficient granular detail to perform precise application. Conversely, the process eliminates superfluous spectral data thereby reducing the overall spectral resolution and in turn, file size. This enables processing and data transfer speeds to be optimised. The above methods generally result in a reduction of file size by two orders of magnitude.

Whilst classification is described in the above embodiment as precedent to on-time processing by the on-board processor 34, it is also envisaged that with appropriate processing power and future development, pre-processing using the pre-processor 32 could occur contemporaneously with application of the treatment applicator 25. Pre-processing could fall within the scope of the on-board processor 34, thus reducing overall workflow and allowing a greater degree of real-time flexibility.

Figure 4:
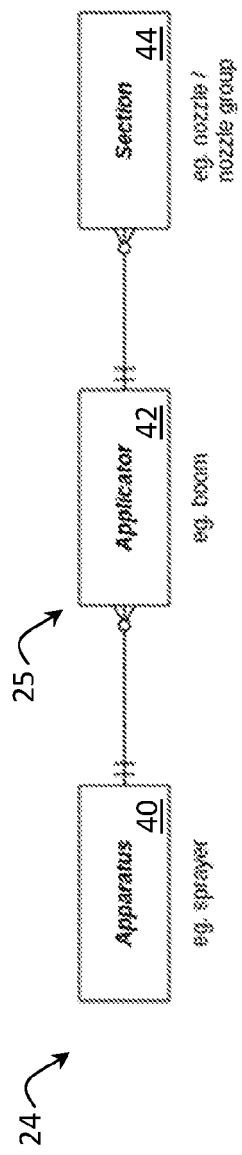
FIG. 4 shows components of a treatment apparatus according to an embodiment of the present invention.

The on-board software implemented by the on-board processor 34 is designed in such a way that the treatment apparatus 24 can comprise one or more treatment applicators 25. Each of the applicators 25 is considered to be an applicator object in the software. In turn, each applicator object can be further divided into one or more sections. Using a hierarchical object-orientated architecture allows system scalability and a broad scope for adapting a variety of apparatus. The simplest configuration is shown in FIG. 4, which consists of a single treatment apparatus 24, in the form of a sprayer 40, with a single section applicator 25 in the form of a boom 42. This sprayer 40 would have several applicator objects each with multiple sections 44 or nozzles to spray agrochemicals.

As mentioned, the system 30 is configured to receive ambient data from the treatment apparatus 24. The ambient data includes static and dynamic metrics relating to the treatment apparatus 24, which are stored using YAML formatted configuration files. Each configuration file is specific to a treatment apparatus and can be readily altered either from within the user interface or externally; i.e. via email or on-line service (e.g. telematics). A guided process is required for establishing these metrics, which are performed post-installation. Metrics used in the case of a sprayer may include: tank capacity, gross weight, steering geometry, applicator dimensions, number of applicators, applicator to applicator restraints, and applicator.

The sensors 26 are configured to collect the ambient data associated with the treatment apparatus 24, including data relating to the field surrounding the treatment apparatus 24, such as vegetation height, ambient temperature and humidity of the field, etc. These sensors 26 include: Global Navigation Satellite System (GNSS); Velocity; Actual applicator storage; Applicator turning angle; Applicator pump speed (if used); Applicator pressure (if used); Applicator nozzle size/type (if used); Boom height, so that application width is known; Boom width; and real time weather condition sensors.

Accurate correlation between the geo-referenced application map data and the ambient data apparatus metrics is important to performance of the treatment applicator. A combination of georeferencing accuracy and spatial resolution of the input map are critical in determining precise application. It should be noted that consistent and timely measurement and resolution datum are also important to ensure precision outcomes.

Application accuracy of the treatment applicators(s) 25, is defined by the relative positions of the applicator(s) 25 and the map targets. In the sprayer example, the map can resolve to 2.5 cm per pixel (GSD) which accounts for the maps scanned resolution and a ±5 cm conservative X/Y georeferencing variance.

For example, the map data does not contain height data of the treatment applicator 25 for the on-board processor 34 to consider when determining the treatment instruction data for actuation of the treatment applicator 25. The on-board processor 34 sources the height data from the ambient data received from sensors 26 on board the treatment apparatus 24. In addition, a digital surface model (DSM) could be used to model the height of the treatment applicator 25 and this modelled height data is used to determine the treatment instruction data.

Nearly all sources of error can be accounted for if location, velocity and orientation of the treatment apparatus 24 and applicator(s) 25 can measured accurately.

Preferably, the treatment apparatus 24 is considered as a collection of dynamic objects in the software. In the case of a self-propelled sprayer of FIGS. 4 and 5, for example, a suspended boom 42 moves independently to the sprayer 40 and is subject to momentum and flexibility. Representing such an apparatus as a static object would result in a loss of application accuracy.

The table below outlines the error sources of significance and possible means with which to reduce them.

| Error Source | Solution |
| --- | --- |
| Apparatus Position (X, Y) | GNSS Real Time Kinematics (RTK) |
| Apparatus Heading | Moving Base RTK/MEMS Sensors |
| Applicator Relative Angle | Chained Moving Base RTK with Inverse Kinematic modelling |
| Map interpretation | "lossless" interpolation algorithms |
| Treatment Actuation Delay | Predetermined metrics |
| Topographical variance | Electronic Distance Measurement (EDM) Sensors |
| Dynamic/environmental effects on treatment means | Modelling dynamic apparatus behaviour & environmental metrics |

From the above table, it's clear that the Global Navigation Satellite System (GNSS) has a significant role in error correction. Real-time Kinematic (RTK) solutions are already commonplace in agriculture; however, moving base and chained solutions are not. A standard base and rover multi-constellation solution can provide real-time accuracy of ~5 cm; however, heading is inherently inaccurate and proportional to speed. The slower the treatment apparatus 24 moves, the lower the accuracy with the magnitude of error proportional to the net length of the applicators 25. For example, additional GNSS antennas may be provided on the treatment apparatus 24 and this ambient location data is used in a chained moving base RTK system to improve errors, such as position, bearing or heading error, in the treatment instructions data to the treatment applicator(s) 25.

Figure 5:
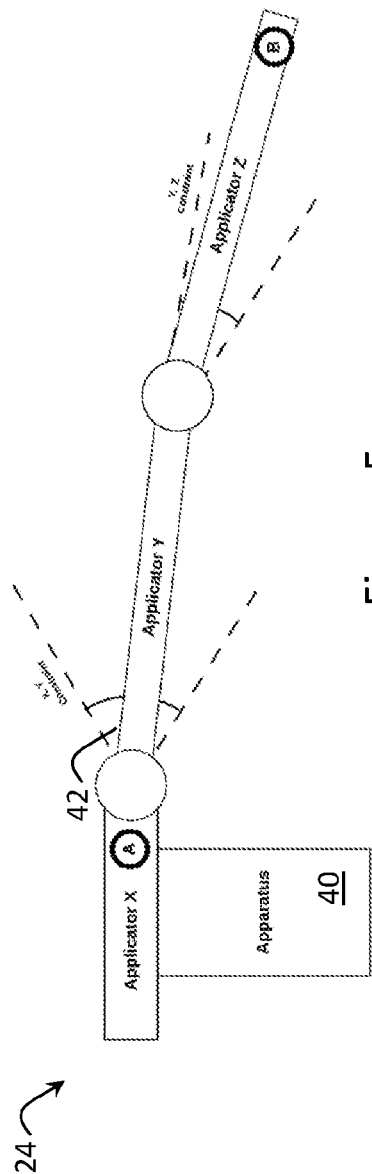
FIG. 5 shows components of a treatment apparatus for kinematic modelling of the components according to an embodiment of the present invention.

The treatment applicator(s) 25, and their components, are modelled as discrete objects in the software, which allows for the configuration of various treatment mechanisms. An example of the kinematic modelling of the components of the treatment apparatus 24 is shown in FIG. 5, where the components are modelled in a dynamic apparatus model based on physical constraints of the treatment apparatus 24, and the results of the dynamic apparatus model are compared to the ambient data sensed sensors 26 of the treatment apparatus 24 to resolve ambient influences on the ambient data. That is, the software combines the ambient data with inverse kinematic modelling to resolve errors between the actual applicator(s) 25 and their instances on the geo-referenced application map data.

In FIG. 5, the treatment applicators 25 are attached to one single treatment apparatus 24 and move dynamically within the constraints of the attachment means, i.e. a pivot or hinge with a dampener. In turn, it is also possible that one or more additional applicators are attached to the applicators 25 and also move dynamically within the constraints of the attachment means.

The modelling of this hierarchy of physical bodies and constraints is known as kinematic modelling. The process which derives the position of an object/s based on the position of another is referred to as inverse kinematics (IK).

In a treatment apparatus model discussed below with reference to FIG. 5, if the geometry and constraint bounds of a connected system of applicators X, Y & Z are known, the position and relative angles of all the applicators can be accurately determined knowing only the distance from A to B. In the context of this example, A and B would represent GNSS devices in a "chained moving base RTK" configuration where the distance between them can be accurately measured in real-time.

Assuming a mean 5 cm positioning error, a 54 m (27+27) implement would be able to resolve angular differentials down to ±0.055 degrees, as per the equation below.

$$\alpha = \cos^{-1}\left(\frac{2700^2 + 2700^2 - 5^2}{2 \cdot 2700 \cdot 2700}\right) = 0.11° \text{ or } \pm 0.055°$$

Whilst seemingly insignificant, allowances need to be made for the inherent inaccuracies introduced when manipulating a digital representation (i.e. image data) of real-world area. The loss of a single pixel equates to a lack of treatment of target vegetation. When considering sources of error such as pixel scaling and position representation, applicator overlaps & translation data loss, the software will always elect to conclude a false positive. In other words, the marginal cost and ultimate value of over application will always exceed that of under applying treatment when considering the consequences of under-application and chemical resistance or, unsprayed vegetation which is allowed to seed and compound infestation.

Figure 6:
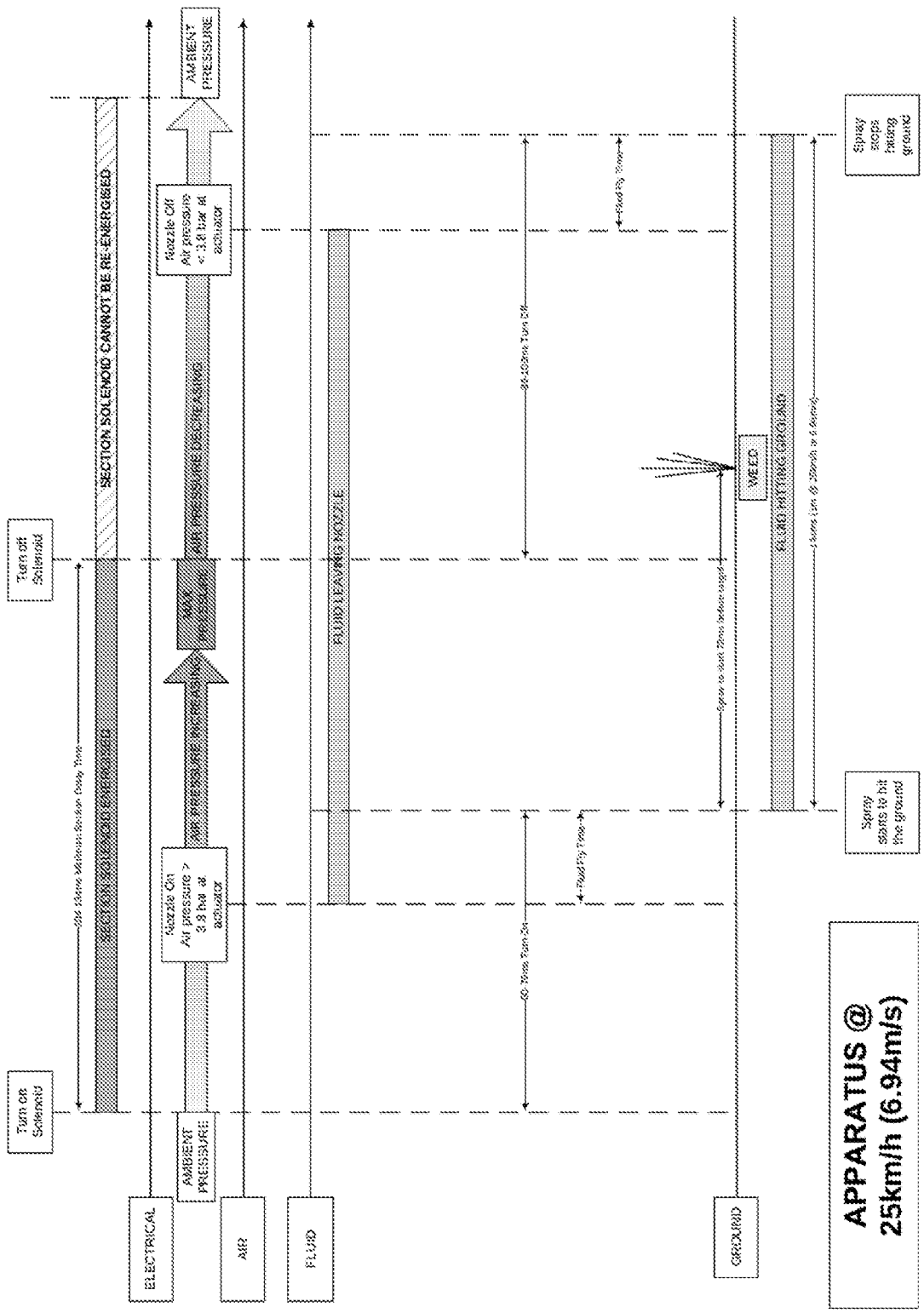
FIG. 6 shows a flow chart of operation of a treatment apparatus according to an embodiment of the present invention.

The software allows for the hysteresis between triggering the treatment means, e.g. nozzle, on the treatment applicator 25, to the time of application. This information is predetermined by physical measurement and stored as a data set, which when combined with velocity inputs, can allow for these delays at any speed. FIG. 6 shows flow chart of a multi-system actuation method that utilises 3 systems: electrical, pneumatic and hydraulic.

Figure 7:
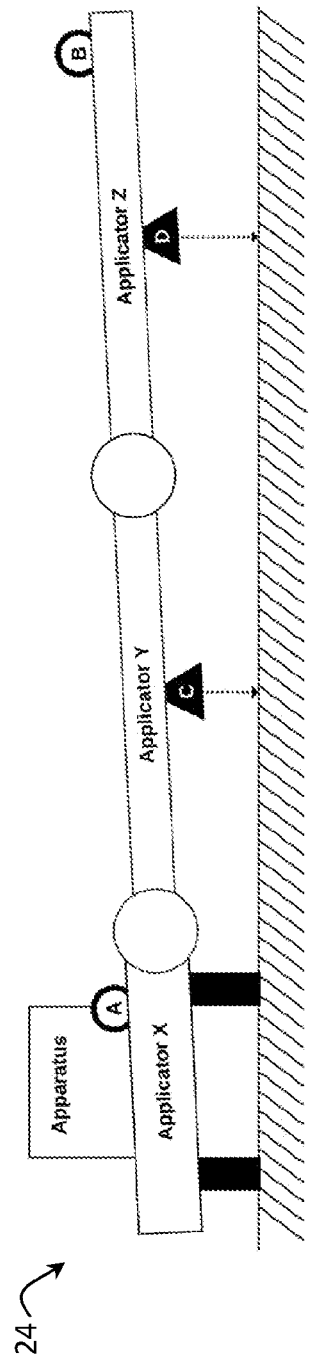
FIG. 7 shows a treatment apparatus in use according to an embodiment of the present invention.

In respect of FIG. 5, an IK model is used to represent the applicator position in 2-dimensional (2D) space. In the case where a treatment applicator 25 has a degree of freedom (DOF) that results in a z-axis translation (or height), the use of additional sensors allows a 3D inverse kinematic model to be implemented. FIG. 7 demonstrates the use of traditional height sensors (C & D) to more accurately measure the rotation of applicator X. This height data is received as ambient data and used to determine the treatment instruction data. In this case, as GNSS sensors are inherently less accurate in resolving height information, electronic distance measurement (EDM) devices are used on the treatment apparatus 24 to offer a higher degree of accuracy. Hence, by using various ambient measurement means or sensors 26, the software can obtain a higher degree of accuracy overall.

Given the enhanced degree of accuracy which is possible by combining all of the previously described elements of the method it is possible to anticipate and measure additional external forces exerted upon the treatment means (e.g. nozzle) at the moment of actuation. The ability to model the trajectory of the treatment means (e.g. nozzle) in concert with auto-compensation for dynamic environmental effects in this method thereby offers the ability to enhance overall accuracy.

Once a dynamic apparatus model (i.e. software model) of the treatment apparatus 24 has been established, it is possible to use this to mitigate sources of error. The model enables real-time positioning of each treatment applicator 25, relative to the treatment apparatus 24 to be precisely determined. The software's manifestation of this model can be thought of as a "footprint" that represents the geometry of applicator/s 25 relative to a position on the map. The "footprint" will, through the assimilation of real-time modelling and sensor information, represent the dynamic movement of the treatment apparatus 24 and its treatment applicators 25 on the map at any given situation and time.

Figure 8:
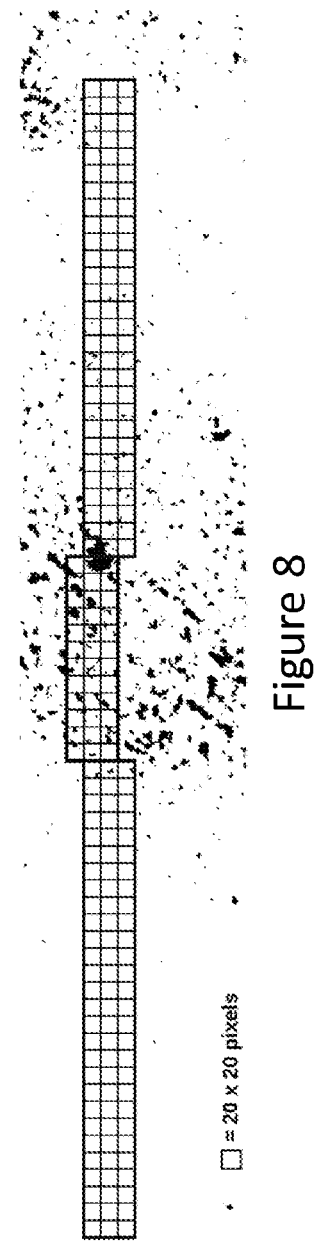
FIG. 8 shows an example of a static treatment apparatus "footprint" according to an embodiment of the present invention.
Figure 9:
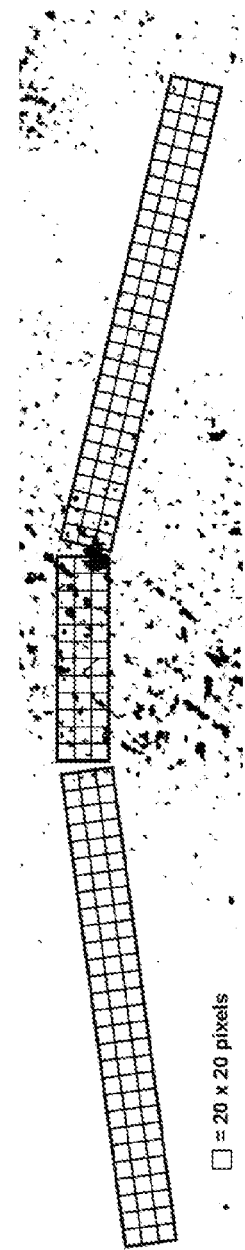
FIG. 9 shows an example of a dynamic treatment apparatus "footprint" according to an embodiment of the present invention.

FIG. 8 represents a 36 m apparatus model with three discrete treatment applicators. Applicators have had a grid applied to indicate scale. FIG. 9 represents the same apparatus, now in motion, where angular offsets have been introduced due to momentum and wind exerting forces on the outer applicators.

Figure 10:
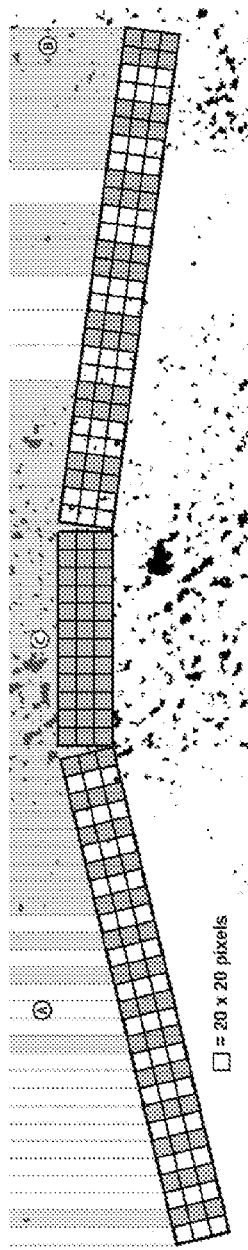
FIG. 10 shows sections of the treatment apparatus "footprint" of FIG. 9.

Using predetermined measurements, each applicator is segmented into discrete sections. Each section may contain either a single or multiple treatment mechanisms. The area of each section will dictate the degree of granularity in respect to the application map. In the case of a sprayer shown in FIG. 10, this could be illustrated as the difference between a single nozzle sections A, 2 nozzles sections B, or individual nozzles sections C.

With a dynamic apparatus model established it is now possible to accurately determine which sections of the geo-referenced application map should be actuated for treatment and provided to the applicators 25 in the treatment instruction data. This is achieved by accessing pixel data within the discrete boundaries of each section per each applicator. This processing needs to occur in real-time at an update rate that ensures optimum precision. The geo-referenced application map data will be loaded into fast access memory in the form of an array data set to ensure access times that facilitate the real-time processing requirement by the on-board processor 34. Applicator positions are used to create subsets from this data set that are analysed on a per-section per-pixel basis.

The applicator boundaries defined within the context of the treatment apparatus' coordinate system needs to be accurately translated into the application maps coordinate reference system (CRF). This process must account for map variations including pixel scale and interpolation caused by crop and rotation.

In order to compensate for the activation and response hysteresis between the triggering of the treatment means, e.g. nozzle, on the treatment applicator 25, and the time of application, it is necessary for the actuation signal to initiate prior to reaching the target. It is therefore necessary for the update rate to be sufficiently timely to ensure that initiation occurs at a point at which optimal target contact can be made.

Referring to an example, if the treatment applicator 25 has an inherent actuation delay of 60-70 ms travels at a faster speed of 35 km/h, the frequency or rate with which relevant data can be obtained (as opposed to the accuracy) needs to be considered to achieve the resolution required. With typical GNSS sensor output rates at between 10-50 Hz, at this speed, a position acquisition occurs at 97.2-19.44 cm intervals respectively. Therefore, a 60-70 ms actuation delay dictates a resolution requirement of 59-69 cm, and a position acquisition rate of a least 14 Hz is required from the sensor.

Figure 11:
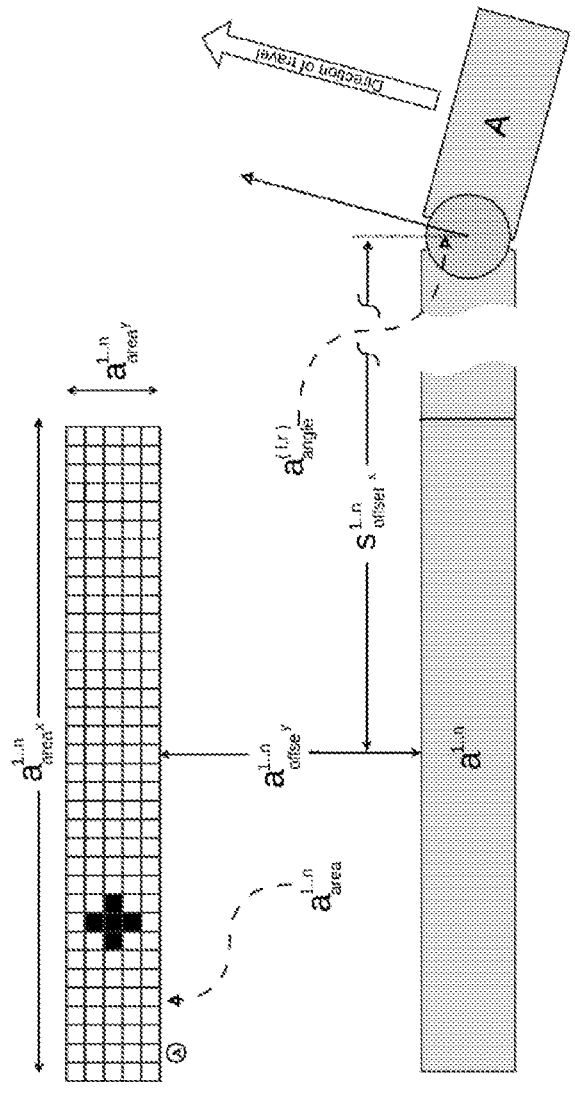
FIG. 11 shows an example of section detection of a treatment apparatus according to an embodiment of the present invention.

Using the techniques described above to accurately position the treatment applicators 25 on the geo-referenced application map, each applicator position is now used to extract map data from that position and load it into an optimised 2-dimensional reduced bit data array. One such example is described in FIG. 11 outlining the geometry metrics and relationships used for the acquisition of applicator a, and its sections, relative to applicator A.

As the geo-referenced application map is orientated north up and pixels are inherently square, an image rotation function needs to occur for any applicators that are not facing true north. In addition, further considerations need to be given to heading angles outside of perpendicular with the map's major axis. The process of rotating an image at arbitrary angles will inherently alter the data within the image. Therefore, an interpolation method needs to be implemented that is "lossless", in the sense that non-zero pixel is never lost during this process.

Figure 12:
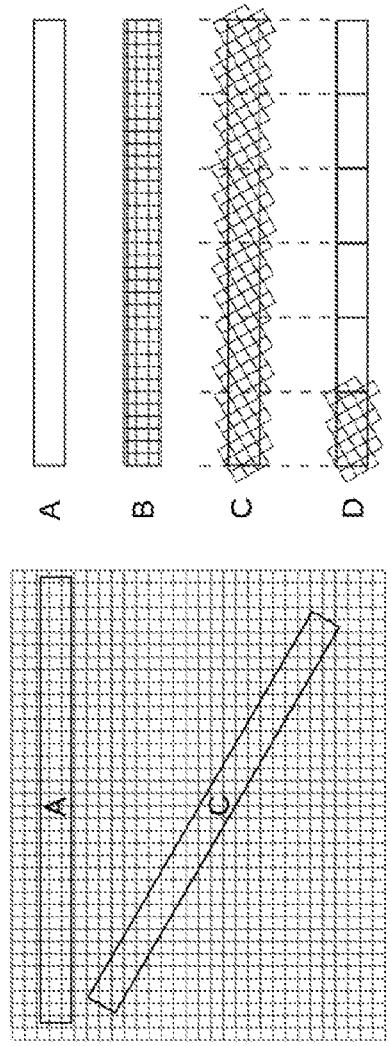
FIG. 12 shows an example of overlap and rotation of a treatment apparatus according to an embodiment of the present invention.

In the event of overlap, with reference to FIG. 12, the final data array will reflect map data within the applicator (A) boundary in addition to data overlapping (B). Boundary (C) demonstrates a non-perpendicular applicator position which exemplifies the inherent translation challenges that present themselves. The software needs to allow for any potential non-zero pixel loss due to overlap or rotation so appropriate "lossless" interpolation techniques are employed to ensure that any ambiguity is accounted for. Furthermore, the process also applies in the case of section to section boundaries (D), where, in the event a non-zero pixel is present in more than one section, both sections are flagged to overlap.

Figure 13:
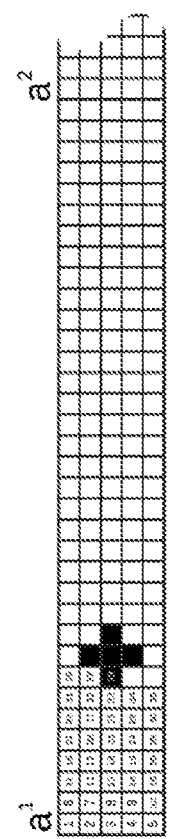
FIG. 13 shows an example of a section array of a treatment apparatus according to an embodiment of the present invention.

After an applicator array has been populated, iteration occurs by using predetermined section dimensions to determine the presence of any non-zero data within each section. If non-zero data is encountered, the section is flagged to actuate, and iteration begins on the next section. Note, for the purposes of speed and efficiency, not all elements of the section array undergo analysis. In the event that a non-zero is encountered, no further iteration is required on that section as shown in with respect FIG. 13. This analysis process occurs synchronously, at a prescribed rate, for all applicator sections at every apparatus position scan.

Compensatory adjustments for dynamic/environmental effects are made at the point of actuation. The target position is recorded in memory 23 and data is stored in a similar low bit array with the same dimensions and properties as the geo-referenced image map and geo-reference application map data. Data in this array is immediately made available to the real-time processing workflow, thus allowing for a treatment applicator 25 to assess whether or not treatment has already been applied to a particular area on the geo-referenced application map. The accuracy and timeliness is imperative to obtaining the benefits it presents, where unintended multiple application of treatment means is eliminated.

Finally, it is to be understood that various alterations, modifications and/or additions may be introduced into the constructions and arrangements of parts previously described without departing from the spirit or ambit of the invention.

The invention claimed is:

1. A computer-implemented method of selectively treating vegetation in a field with a treatment apparatus that is configured to move in the field and to treat vegetation in the field, the method including:
   receiving geo-referenced image data of a field, from one or more image capture devices not coupled to the treatment apparatus, wherein the geo-referenced image data includes a plurality of pixels and geo-reference data associated with each one of the pixels, and wherein the geo-referenced image data is recordable as data native to the one or more image capture devices such that a format of the geo-reference image data is the same as a format of data captured by the one or more image capture devices;
   analysing spectral information of the pixels to classify pixels as target vegetation in the field;
   determining a location of the target vegetation in the field based on the geo-reference data associated with pixels classified as said target vegetation;
   determining geo-referenced application map data based on the location of the target vegetation in the field, wherein pixels not classified as said target vegetation are not included in the geo-referenced application map data;
   providing the geo-referenced application map data to the treatment apparatus and moving the treatment apparatus based on the geo-referenced application map data;
   receiving ambient data from the treatment apparatus moving in the field;
   determining treatment instruction data for actuation of at least one treatment applicator, disposed on the treatment apparatus, configured to treat vegetation in the field, based on the geo-referenced application map data correlated with the ambient data;
   providing the treatment instruction data to the at least one treatment applicator; and
   the at least one treatment applicator treating the target vegetation in the field based on the treatment instruction data when the treatment apparatus is moved to the target vegetation in the field.

2. A computer-implemented method according to claim 1, further including determining an optimal route for the treatment apparatus to move in the field based on the location of the target vegetation in the field and recording the optimal route in the geo-referenced application map data.

3. A computer-implemented method according to claim 1, wherein analysing the spectral information of the pixels includes unsupervised and or supervised classification using a classifier trained on a spectral signature of target vegetation in a field.

4. A computer-implemented method according to claim 3, further including embedding a chlorophyll spectral signature in selected pixels of the geo-referenced image data corresponding to vegetation in the field, and analysing the chlorophyll spectral signature in the selected pixels using the classifier.

5. A computer-implemented method according to claim 3, further including classifying the target vegetation in the field as a plurality of grades of target vegetation based on a vegetation index.

6. A computer-implemented method according to claim 3, wherein the geo-referenced image data of the field includes a plurality of channels of data, and the method further includes consolidating the channels to form one channel for the geo-referenced application map data by representing the target vegetation as a vector of intensity values.

7. A computer-implemented method according to claim 6, further including segmenting the geo-referenced application map data by applying one or more threshold values to the intensity values.

8. A computer-implemented method according to claim 1, wherein the geo-reference image data has a resolution of less than or equal to 5 cm.

9. A computer-implemented method according to claim 1, wherein analysing the spectral information of the pixels includes classifying pixels as areas of the field that are not target vegetation in the field, and determining areas of the field that remain as the target vegetation in the field.

10. A computer-implemented method according to claim 1, wherein the treatment apparatus further includes a plurality of sensors for sensing the ambient data.

11. A computer-implemented method according to claim 10, wherein the treatment apparatus is a sprayer carrying one or more agrochemicals for the at least one treatment applicator to treat the target vegetation in the field, and the treatment instruction data includes instructions for applying the one or more agrochemicals to the target vegetation in the field with the at least one treatment applicator.

12. A computer-implemented method according to claim 11, wherein the treatment apparatus includes more than one treatment applicator, and the method includes selecting one of the treatment applicators closest to the target vegetation in the field to treat the target vegetation based on the ambient data.

13. A computer-implemented method according to claim 12, wherein the treatment apparatus includes a rigid portion and a flexible suspended boom including the treatment applicators disposed thereon, each having one or more nozzles for applying the one or more agrochemicals to the target vegetation in the field.

14. A computer-implemented method according to claim 13, wherein a plurality of sensors are disposed on the rigid portion and the flexible suspended boom at spaced apart locations, and the plurality of sensors sense position data of each of the one or more nozzles relative to the rigid portion of the treatment apparatus.

15. A computer-implemented method according to claim 14, wherein the plurality of sensors further sense heading data of each of the one or more nozzles, and the method includes determining in real-time a position of each of the one or more nozzles in the field.

16. A computer-implemented method according to claim 1, further including kinematic modelling of components of the treatment apparatus in a dynamic apparatus model based on physical constraints of the treatment apparatus, and comparing the dynamic apparatus model to the ambient data sensed by a plurality of sensors of the treatment apparatus to resolve ambient influences on the ambient data.

17. A computer-implemented method according to claim 1, further including receiving the geo-referenced image data from an unmanned aerial vehicle (UAV), or a manned aerial vehicle, including the one or more image capture devices, configured to fly over the field and to generate the geo-referenced image data.

18. A computer-implemented method according to claim 1, further including receiving the geo-referenced image data from one or more satellites including the one or more image capture devices.

19. A system for selectively treating vegetation in a field, the system including:
- a treatment apparatus configured to move in the field and to treat vegetation in the field with at least one treatment applicator disposed on the treatment apparatus; and
- one or more processors configured to:
  - receive geo-referenced image data of a field, from one or more image capture devices not coupled to the treatment apparatus, wherein the geo-referenced image data includes a plurality of pixels and geo-reference data associated with each one of the pixels, and wherein the geo-referenced image data is recordable as data native to the one or more image capture devices such that a format of the geo-reference image data is the same as a format of data captured by the one or more image capture devices;
  - analyse spectral information of the pixels to classify pixels as target vegetation in the field;
  - determine a location of the target vegetation in the field based on the geo-reference data associated with pixels classified as said target vegetation;
  - determine geo-referenced application map data based on the location of the target vegetation in the field, wherein pixels not classified as said target vegetation are not included in the geo-referenced application map data;
  - provide the geo-referenced application map data to the treatment apparatus and move the treatment apparatus based on the geo-referenced application map data;
  - receive ambient data from the treatment apparatus moving in the field;
  - determine treatment instruction data for actuation of the at least one treatment applicator based on the geo-referenced application map data correlated with the ambient data; and
  - provide the treatment instruction data to the at least one treatment applicator, wherein
- the at least one treatment applicator is configured to treat the target vegetation in the field based on the treatment instruction data when the treatment apparatus is moved to the target vegetation in the field.

* * * * *